B. J. PATRICK.
CONTROLLING MECHANISM FOR MOTOR VEHICLES.
APPLICATION FILED NOV. 16, 1911.
1,032,934.
Patented July 16, 1912.
2 SHEETS—SHEET 1.
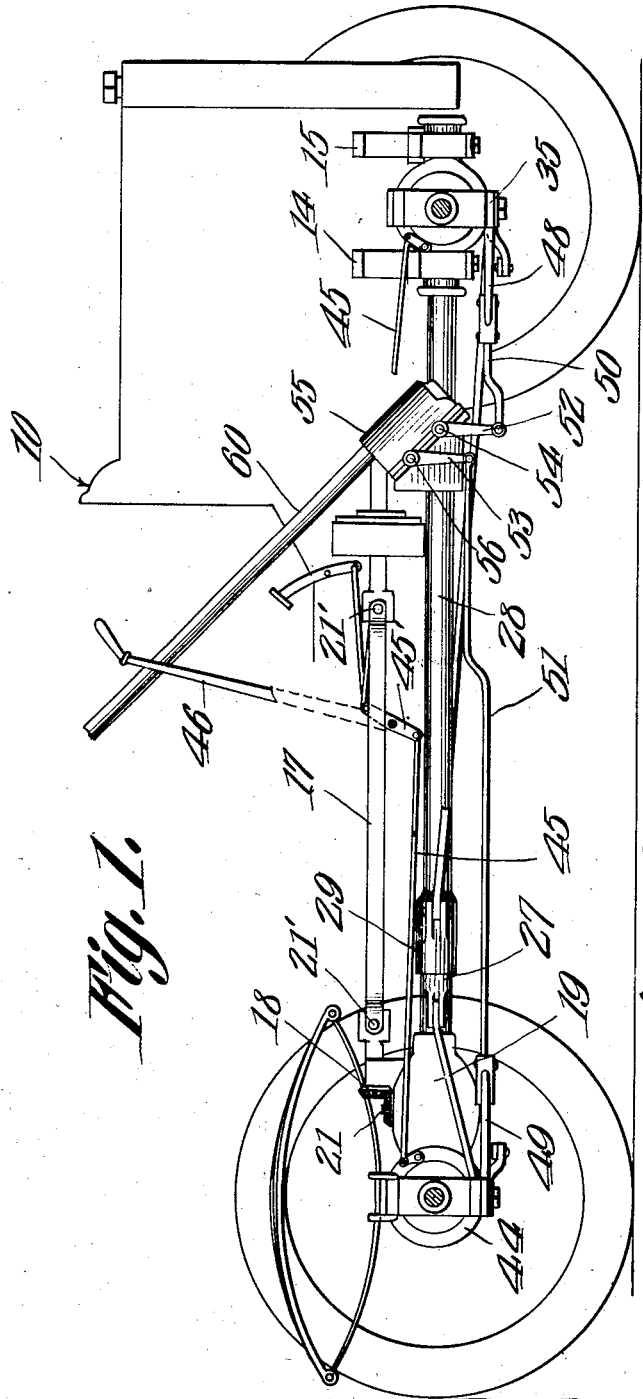
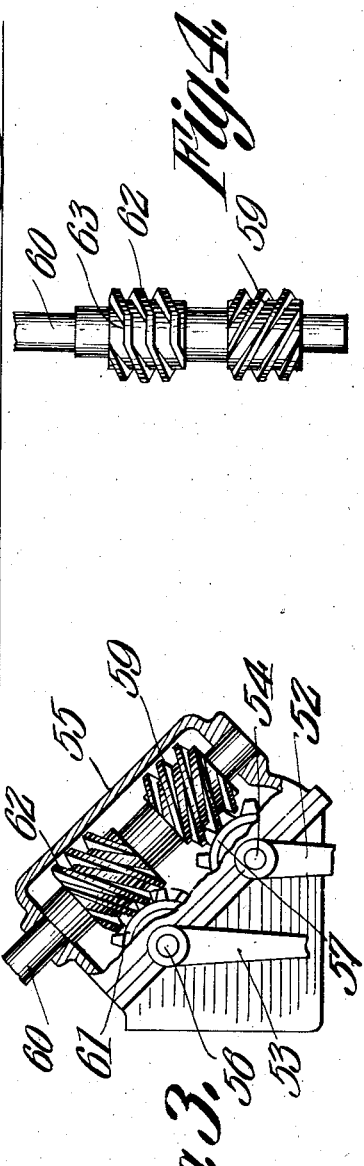
Witnesses
B. J. Patrick, Inventor,
by C. A. Snow & Co.,
Attorneys.

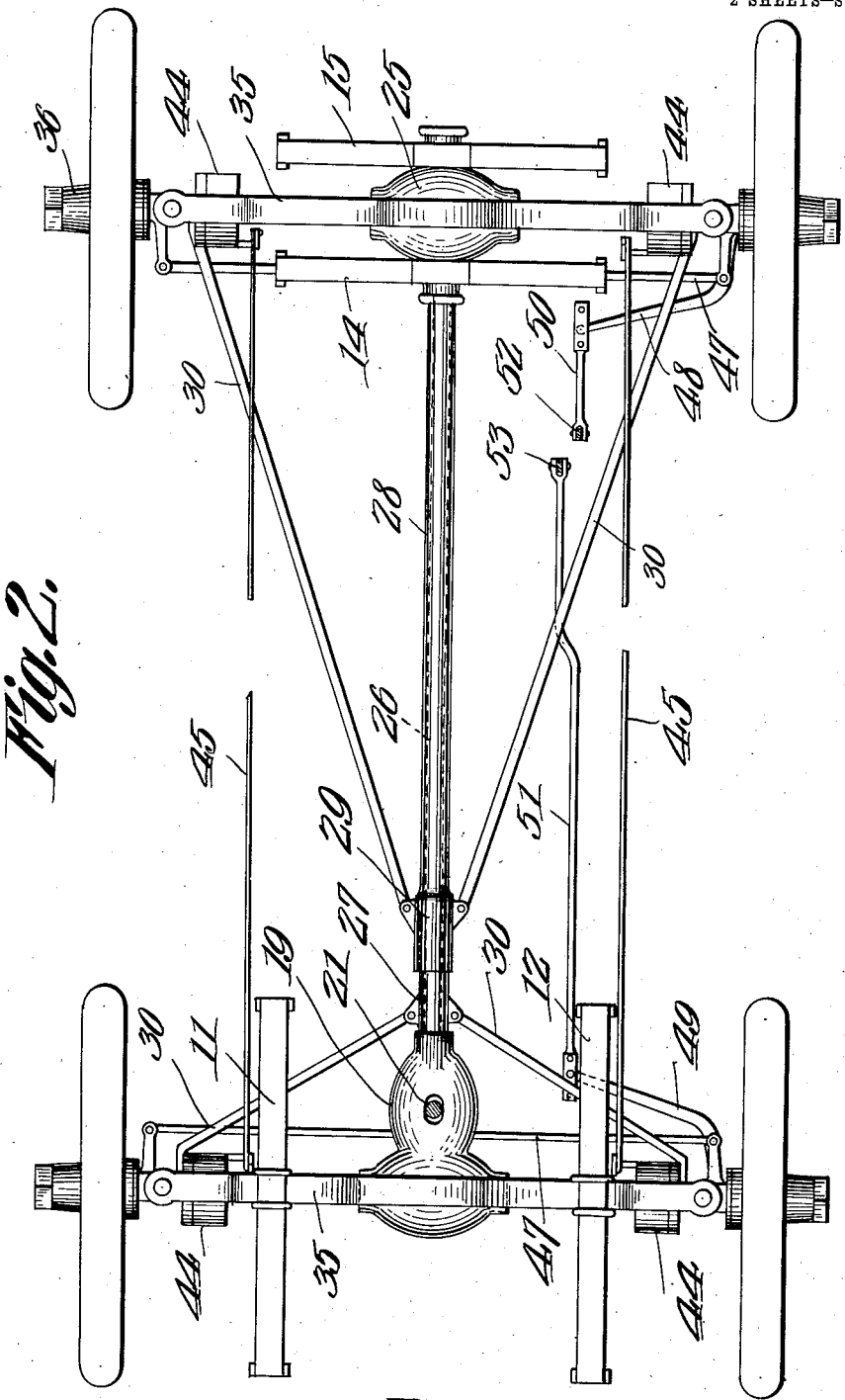

UNITED STATES PATENT OFFICE.

BENNETT J. PATRICK, OF BROOKFIELD, MISSOURI.

CONTROLLING MECHANISM FOR MOTOR-VEHICLES.

1,032,934. Specification of Letters Patent. Patented July 16, 1912.

Application filed November 16, 1911. Serial No. 660,673.

*To all whom it may concern:*

Be it known that I, BENNETT J. PATRICK, a citizen of the United States, residing at Brookfield, in the county of Linn and State of Missouri, have invented a new and useful Controlling Mechanism for Motor-Vehicles, of which the following is a specification.

This invention relates to an improvement in controlling mechanisms for motor vehicles.

One object of the present invention is to provide means for driving each of the wheels of a motor vehicle.

A further object of the invention is to provide means for applying a brake to each of the wheels.

A still further object of the invention is to provide means for steering the front and rear wheels of the vehicle.

A still further object of the invention is to provide means whereby the movement of the steering wheels which while consonantly steering the front and rear wheels will move the front wheel in advance of the rear wheel.

In the drawings:—Figure 1 is a side elevation of a car equipped with the improved driving mechanism. Fig. 2 is a top plan view, the body of the car being removed. Fig. 3 is a detail view of the steering mechanism and Fig. 4 a detail view of the same removed from the box.

In the drawings 10 designates the body of the car which is supported at three points by the springs 11, 12, 14 and 15. The motor may be of any desired construction and drives a shaft 17 which extends longitudinally of the car, its end portion being provided with a pinion 18 disposed directly above a gear box 19 and in mesh with a pinion 20 on the vertically disposed driven shaft 21. The shaft 21 drives a second longitudinally disposed shaft 26 which extends within the gear boxes 19 and 25 driving the front and rear axles. This driven shaft is supported by sleeves 27 and 28, the longer sleeve 28 being formed with the enlarged end portion 29 which receives the end portion of the shorter sleeve 27. The sleeves being connected to the bolsters by struts 30, this arrangement of the sleeves allowing the front and rear axles to tilt independently as the car passes over an obstruction. The drive shaft is provided with the universal joints 21' which allow for this tilting.

The front and rear wheels are steered by means of rods 47 which are actuated by levers 48 and 49, the lever 48 being connected to the short link 50 and the lever 49 being connected to the long link 51. The link 50 is connected to the arm 52 and the link 51 to the arm 53, the arm 52 being mounted on a shaft 54 which extends within the steering box 55, the arm 53 being mounted upon the shaft 56 which extends within the said steering box. Arranged on the shaft 54 is the segment 57 which meshes with a worm 59 which is arranged adjacent the end of the steering staff 60, the end of said staff being supported by the lower portion of the box 55. Arranged on the shaft 56 is a segment 61 which meshes with a worm 62 positioned on the shaft 60. It will be noted that as the shaft is rotated the worms will impart movement to the segments which will in turn move the levers to steer the front and rear axles, the worm 59 which meshes with the segment 57 imparting movement to the front wheels and the worm 62 imparting movement to the rear wheels. In order that the front wheels may be turned in advance of the rear wheels the worm 62 is provided with the portions 63 which are concentric with the shaft 60. Thus as the shaft is rotated movement will first be imparted to the segment 57, the rotation of said segment occurring slightly in advance of the rotation of the segment 61.

It will be noted that in a construction of this character each of the wheels will be driven separately in a simple and convenient manner, means being provided for simultaneously applying the brake to all of the wheels, the steering means being such which while consonantly steering the front and rear axles, the same imparts movement to the front wheels in advance of the movement which is imparted to the rear wheels.

It will be noted that the entire construction is such as may be easily and economically manufactured, the various parts being readily assembled.

What is claimed is:—

1. In a controlling mechanism for motor vehicles, steering levers connected to the front and rear wheels, means for consonantly moving all of said levers, and means for imparting movement to the lever which actuates the front wheels, in advance of the movement imparted to the rear wheels.

2. In a controlling mechanism for motor vehicles, levers connected to the front and rear steering bars, a plurality of shafts, segments mounted upon each of said shafts, a link connection between each segment, and a corresponding lever, a steering post, worms mounted upon said post and adapted to impart movement to said segments, one of said worms being formed with portions which are concentric with the post.

3. In a controlling mechanism for motor vehicles, steering levers connected to the front and rear steering bars, a plurality of segments, a connection between each of said segments and a corresponding lever, and a steering post which when rotated imparts movement to said levers through said segments, one of said levers being actuated in advance of the other.

In testimony that I claim the foregoing as my own, I have hereto affixed my signature in the presence of two witnesses.

BENNETT J. PATRICK.

Witnesses:
H. W. CRAIG,
WALTER BROWNLEE.